(12) United States Patent
Porte et al.

(10) Patent No.: US 8,505,679 B2
(45) Date of Patent: Aug. 13, 2013

(54) PANEL FOR THE ACOUSTIC TREATMENT WITH A PROGRESSIVE THICKNESS

(75) Inventors: Alain Porte, Colomiers (FR); Cedric Leconte, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 13/514,765

(22) PCT Filed: Dec. 20, 2010

(86) PCT No.: PCT/FR2010/052813
§ 371 (c)(1),
(2), (4) Date: Jun. 8, 2012

(87) PCT Pub. No.: WO2011/086273
PCT Pub. Date: Jul. 21, 2011

(65) Prior Publication Data
US 2012/0241249 A1    Sep. 27, 2012

(30) Foreign Application Priority Data
Dec. 22, 2009  (FR) ...................................... 09 59396

(51) Int. Cl.
*B64D 33/02* (2006.01)
(52) U.S. Cl.
USPC .......................................... 181/214; 415/119
(58) Field of Classification Search
USPC .......................................... 181/214; 415/119
See application file for complete search history.

(56) References Cited

U.S. PATENT DOCUMENTS

| 5,160,248 A | * | 11/1992 | Clarke ............................... 415/9 |
| 6,009,701 A | * | 1/2000 | Freeman et al. ................. 60/223 |
| 6,027,307 A | * | 2/2000 | Cho et al. .................... 415/173.5 |
| 6,328,258 B1 | | 12/2001 | Porte |
| 2006/0169533 A1 | * | 8/2006 | Patrick ........................... 181/210 |
| 2006/0237260 A1 | * | 10/2006 | Costa et al. .................... 181/210 |
| 2009/0324390 A1 | * | 12/2009 | Harper et al. ................. 415/119 |
| 2011/0114787 A1 | | 5/2011 | Porte et al. |

FOREIGN PATENT DOCUMENTS

| EP | 1 013 910 A1 | 6/2000 |
| EP | 1 357 279 A2 | 10/2003 |
| FR | 2 929 991 A1 | 10/2009 |
| GB | 1 490 923 A | 11/1977 |

OTHER PUBLICATIONS

International Search Report, dated May 3, 2011, from corresponding PCT application.

* cited by examiner

*Primary Examiner* — Forrest M Phillips
(74) *Attorney, Agent, or Firm* — Young & Thompson

(57) ABSTRACT

An aircraft nacelle includes an air inlet (110) with a lip (114) extended to the back by a passage (116) to channel an air flow to a drive (112), the passage having at least one acoustic treatment panel (120) that includes, from the outside to the inside: an acoustically resistant porous layer (122); at least one cell-like structure (124), whose cells are sized for acoustic treatment; and a reflective or sealed layer (126). The reflective layer includes, near the end thereof that is oriented toward the lip, a surface (130) that is angled so as to be connected to the lip. A cell-like structure (136) is in contact with the angled surface, which forms an angle less than 30° with the tangent on the acoustically resistant layer. The cell-like structure is inserted between the angled surface of the reflective layer and an acoustically resistant porous layer.

20 Claims, 3 Drawing Sheets

PANEL FOR THE ACOUSTIC TREATMENT WITH A PROGRESSIVE THICKNESS

BACKGROUND OF THE INVENTION

1. Field of the Invention

This invention relates to a scalable-thickness acoustic treatment panel.

2. Description of the Related Art

An aircraft propulsion system comprises a nacelle in which a power plant that is connected by the means of a mast to the rest of the aircraft is arranged in an essentially concentric manner.

As illustrated in FIG. 1, at the front, the nacelle comprises an air intake 10 that makes it possible to channel an air flow in the direction of the power plant 12, with a first portion of the incoming air flow, called primary flow, passing through the power plant to take part in the combustion process, whereby the second portion of the air flow, called secondary flow, is entrained by a fan and flows into an annular pipe that is bordered by the inside wall of the nacelle and the outside wall of the power plant.

The air intake 10 comprises a lip 14 whose surface that is in contact with the aerodynamic flows is extended inside the nacelle by an inside pipe 16 with essentially circular cross-sections and outside of the nacelle by an outside wall 18 with essentially circular cross-sections.

Techniques have been developed to reduce the noise emitted by an aircraft, and in particular the noise that is emitted by the propulsion systems. They consist in placing—in particular at the level of the wall of the inside pipe 16—a panel or covering 20 whose purpose is to take up a portion of the sound energy, in particular by using the Helmholtz resonator principle.

In a known manner, an acoustic treatment panel 20, also called an acoustic attenuation covering, comprises—from the outside to the inside—an acoustically resistive porous layer 22, at least one alveolar structure 24, and a reflective or impermeable layer 26.

The pipe 16 is to provide the uptake of at least a portion of the mechanical stresses between the lip 14 and the power plant 12. To limit the constraints at the acoustically resistive porous layer 22, stresses are transmitted between the lip 14 and the power plant 12 essentially via the reflective layer 26.

For this purpose, a flange 28 provides the connection between the power plant 12 and the reflective layer 26.

To provide the connection between the pipe 16 and the lip 14, the reflective layer 26 is flattened against the acoustically resistive porous layer 22, with the two layers 22 and 26 being made integral by any suitable means with the lip 14.

For this purpose, close to its end that is oriented toward the lip 14, the reflective layer comprises a slightly inclined face 30 (an angle of 45 to 60° relative to the acoustically resistive layer) over a length L, on the order of several centimeters, very significantly less than the remaining length A of the pipe 16 (with L representing on the order of 1% of A). To maintain this geometric shape, an alveolar structure 32 is provided in the space that is delimited by the acoustically resistive porous layer 22 and the inclined face 30. To provide the uptake of the compression stresses, the alveolar structure 32, in general in the form of a honeycomb, comprises cells with relatively small diameters that are not effective on the plane of acoustic treatment unlike the cells of the alveolar structure 24 whose cells are sized for acoustic treatment.

According to another aspect, the acoustic treatment panel 16 comprises an offset 34 at the surface that is in contact with the aerodynamic flows providing the housing of the end of the lip and optionally a flange of the front frame, facing which the connecting means are arranged.

Taking into account this offset 34, according to a first variant that is illustrated in FIG. 2, the acoustically resistive layer 22 comprises reinforcement folds 36 to provide the transmission of stresses that extend from the zone that is downstream from the offset 34 up to the point facing said offset.

The presence of these reinforcement folds 36 affects the porosity of the acoustically resistive layer 22, although the panel 16 no longer provides the acoustic treatment function facing the zone of these folds 36, which corresponds essentially to the non-treated zone because of the small dimensions of the cells of the alveolar structure 32.

As a variant, as illustrated in FIG. 3, the acoustic treatment panel 16 comprises a block 38 with an offset 34 and a beveled shape 40 at which the acoustically resistive layer 22 is made integral. With this block 38 not being porous, the acoustic treatment panel 16 no longer provides the acoustic treatment function opposite the zone of the block 38, which corresponds essentially to the non-treated zone because of the small dimensions of the cells of the alveolar structure 32.

Thus, according to the variants of the prior art, the junction zone between the pipe 16 and the lip 14, and in particular the zone that corresponds to the length L, is not treated on the acoustic plane.

The document U.S. Pat. No. 5,160,248 describes an acoustic treatment panel that at one end comprises a reinforcement for withstanding an impact from the breaking of a fan's blades. Inserted between two solid plates, this reinforcement comprises a stack of alveolar structures, with the rear solid plate being slightly tilted. The alveolar structures of the reinforcement are sized to withstand the impact and not to treat the acoustic waves. According to another aspect, the solid plate that is in contact with the aerodynamic flows is not porous but solid and does not make possible the passage of waves in the direction of the cavities of the reinforcement.

BRIEF SUMMARY OF THE INVENTION

Also, the purpose of this invention is to remedy the drawbacks of the prior art by proposing a nacelle that has a treated surface on the acoustic plane that is greater than that of the prior art.

For this purpose, the invention has as its object an aircraft nacelle that comprises an air intake with a lip that is extended toward the rear by a pipe that makes it possible to channel an air flow in the direction of a power plant, whereby said pipe comprises at least one acoustic treatment panel that comprises—from the outside to the inside—an acoustically resistive porous layer, at least one alveolar structure whose cells are sized for acoustic treatment, and a reflective or impermeable layer, whereby close to its end that is oriented toward the lip, said reflective layer comprises a face that is inclined in such a way as to be connected to the lip, with an alveolar structure being in contact with the inclined face of the reflective layer, the inclined face forming an angle of less than 30° with the tangent to the acoustically resistive layer, characterized in that the alveolar structure is inserted between said inclined face of the reflective layer and an acoustically resistive porous layer, with the cells of the alveolar structure being sized for acoustic treatment.

This characteristic makes it possible to distribute the compression stresses experienced by the alveolar structure on a larger surface although the pressure that is exerted by said compression stresses on said alveolar structure is significantly lower than for the prior art. Consequently, to the extent that the compression constraints are considerably lower, it is possible to select for the cells of the alveolar structure a diameter that is adapted for acoustic treatment, whereby this diameter is larger than that which is necessary for withstanding the compression stresses. Thus, unlike in the prior art, the cells of the alveolar structure are sized for acoustic treatment and not for withstanding compression, although the surface that is treated on the acoustic plane is increased.

BRIEF DESCRIPTION OF THE DRAWINGS

Other characteristics and advantages will emerge from the following description of the invention, a description that is provided only by way of example, relative to the accompanying drawings, in which.

DETAILED DESCRIPTION OF THE PREFERRED EMBODIMENTS

Figure 1:
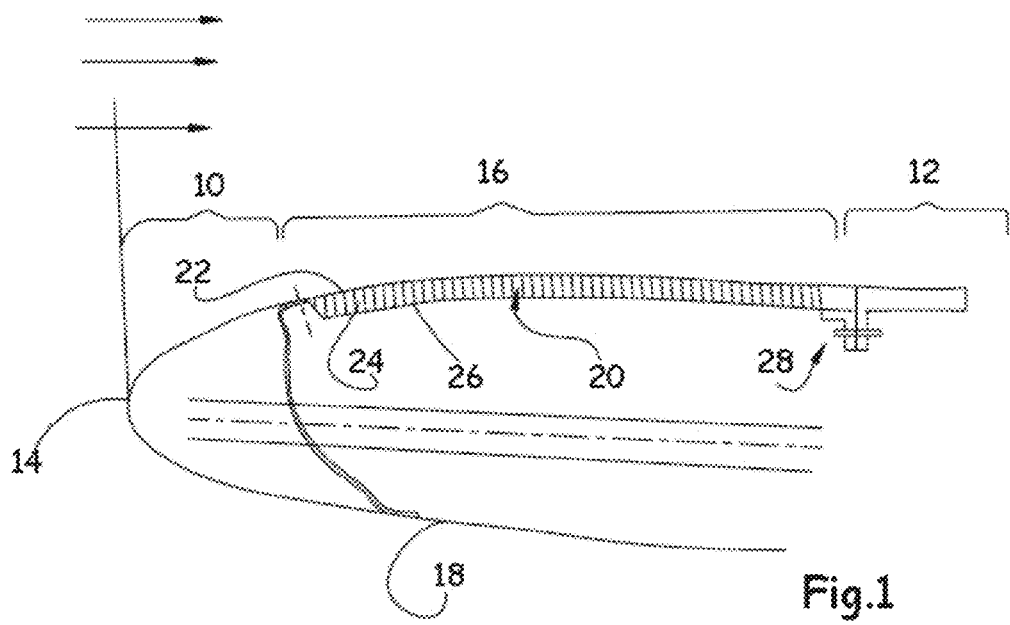
FIG. 1 is a diagrammatic cutaway along a radial plane of a portion of the front of an aircraft nacelle according to the prior art.
Figure 2:
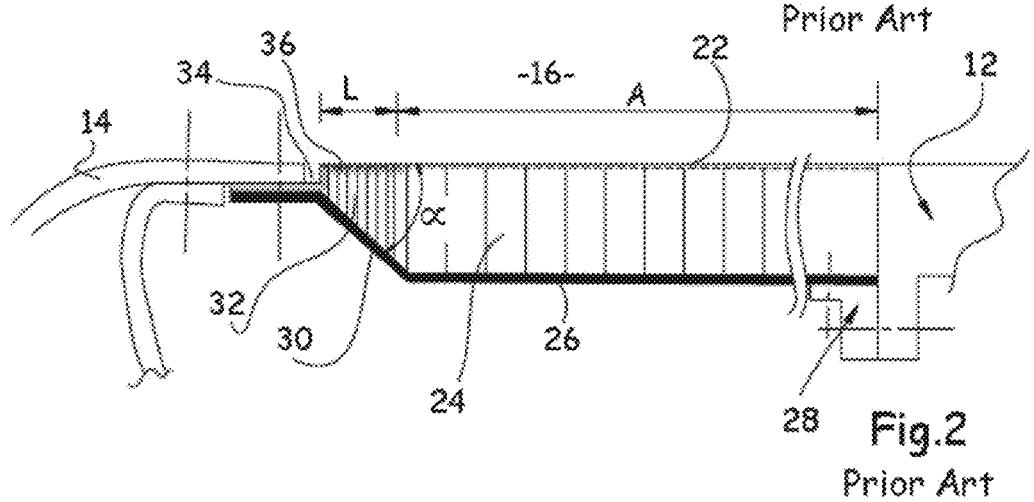
FIG. 2 is a cutaway that illustrates the junction zone between the lip and the panel providing the acoustic treatment function according to a variant of the prior art.
Figure 3:
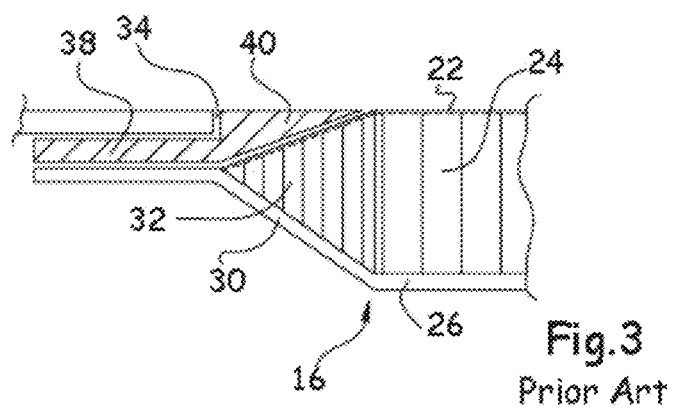
FIG. 3 is a cutaway that illustrates the junction zone between the lip and the panel providing the acoustic treatment function according to another variant of the prior art.
Figure 4:
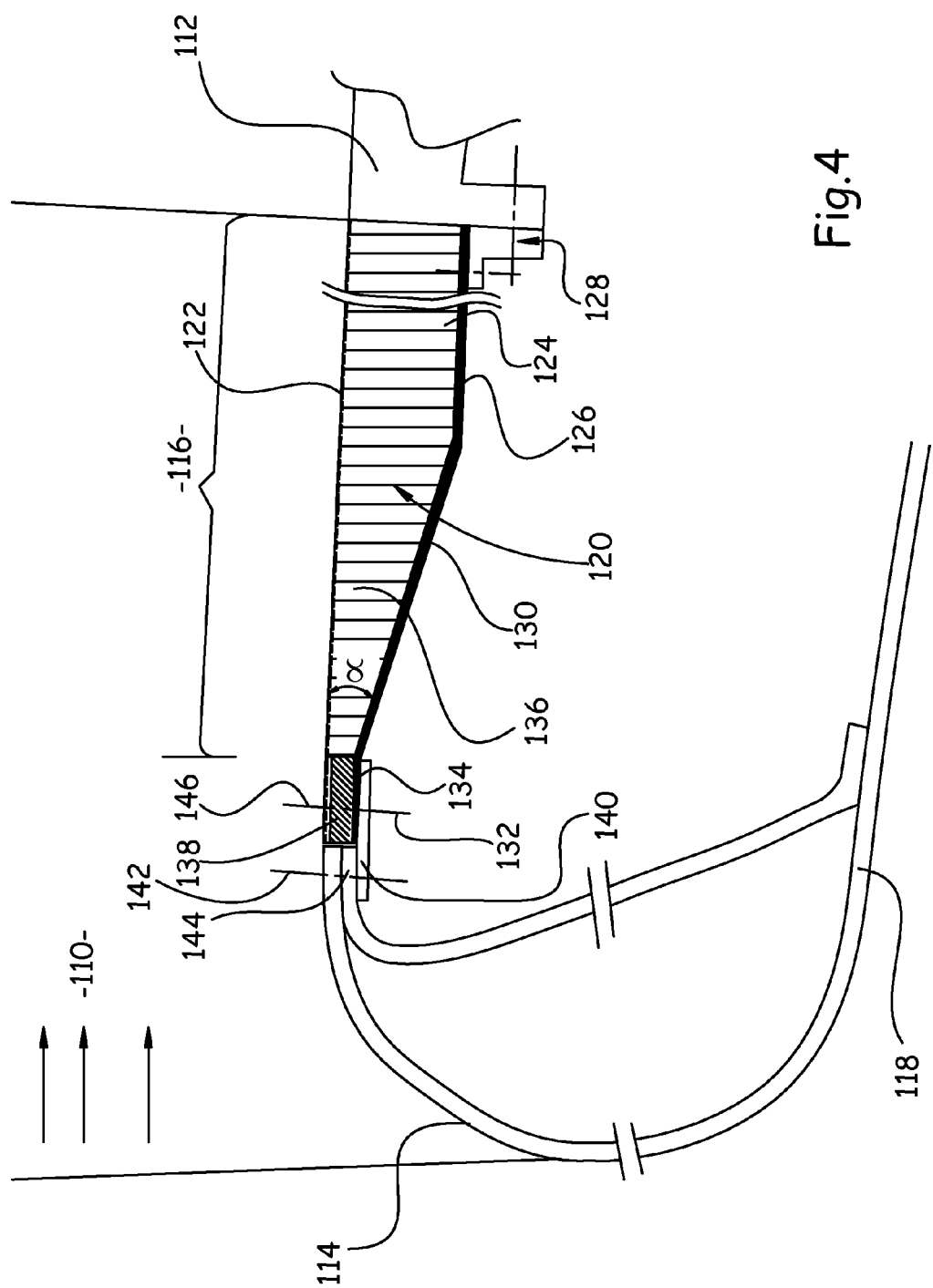
FIG. 4 is a cutaway that illustrates the junction zone between a lip and an acoustic treatment panel according to a variant of the invention.

FIG. 4 shows in detail an air intake 110 that makes it possible to channel an air flow in the direction of a power plant 112 of an aircraft nacelle. The air intake 110 comprises a lip 114 of which the surface that is in contact with the aerodynamic flows is extended inside the nacelle via an inside pipe 116 with essentially circular cross-sections and outside of the nacelle by an outside wall 118 with essentially circular cross-sections.

This pipe 116 consists of at least one panel 120 or several panels that are connected to one another.

In a known manner, the panel 120 comprises—from the outside to the inside—an acoustically resistive porous layer 122, at least one alveolar structure 124 and a reflective or impermeable layer 126. As a variant, the panel 120 can comprise several superposed alveolar structures between which acoustically resistive porous layers are provided. The cells of the alveolar structure(s) 124 are sized to provide an optimized acoustic treatment.

According to an embodiment, the alveolar structure comes in the form of a honeycomb, and the reflective layer comes in the form of a piece of sheet metal.

The acoustic treatment panel 120 is connected to the power plant 112 by any suitable means. By way of example, a flange 128 can provide the connection between the reflective layer 126 of the acoustic treatment panel and a collar that is provided at the front of the power plant 112.

The connecting means between the acoustic treatment panel 120 and the power plant are not presented in more detail because they are known to one skilled in the art. The acoustic treatment panel 120 is connected directly or indirectly to the lip 114. For this purpose, close to its end that is oriented toward the lip 114, the reflective layer 126 comprises an inclined face 130 in such a way as to reduce the thickness of the acoustic panel to make possible its attachment to the lip 114. Thus, the connecting means 132 between the panel 120 and the lip 114 are provided facing a strip 134 at the end of the reflective layer 126, arranged essentially parallel to the acoustically resistive porous layer 122.

The acoustic treatment panel 120 comprises an alveolar structure 136 that is inserted between the acoustically resistive porous layer 122 and the inclined face 130 of the reflective layer.

According to the invention, the inclined face 130 forms an angle α of less than 30° with the tangent to the acoustically resistive layer.

This characteristic makes it possible to distribute the compression stresses experienced by the alveolar structure 136 on a larger surface, although the pressure that is exerted by said compression stresses on said alveolar structure 136 is significantly lower than that for the prior art. Consequently, to the extent that the compression constraints are considerably lower, it is possible to select a diameter that is adapted for acoustic treatment for the cells of the alveolar structure 136, with this diameter being larger than the one that is necessary for withstanding the compression stresses. Thus, contrary to the prior art, the cells of the alveolar structure 136 are sized for acoustic treatment and not for resistance to compression, although the surface that is treated on the acoustic plane is increased.

Figure 5:
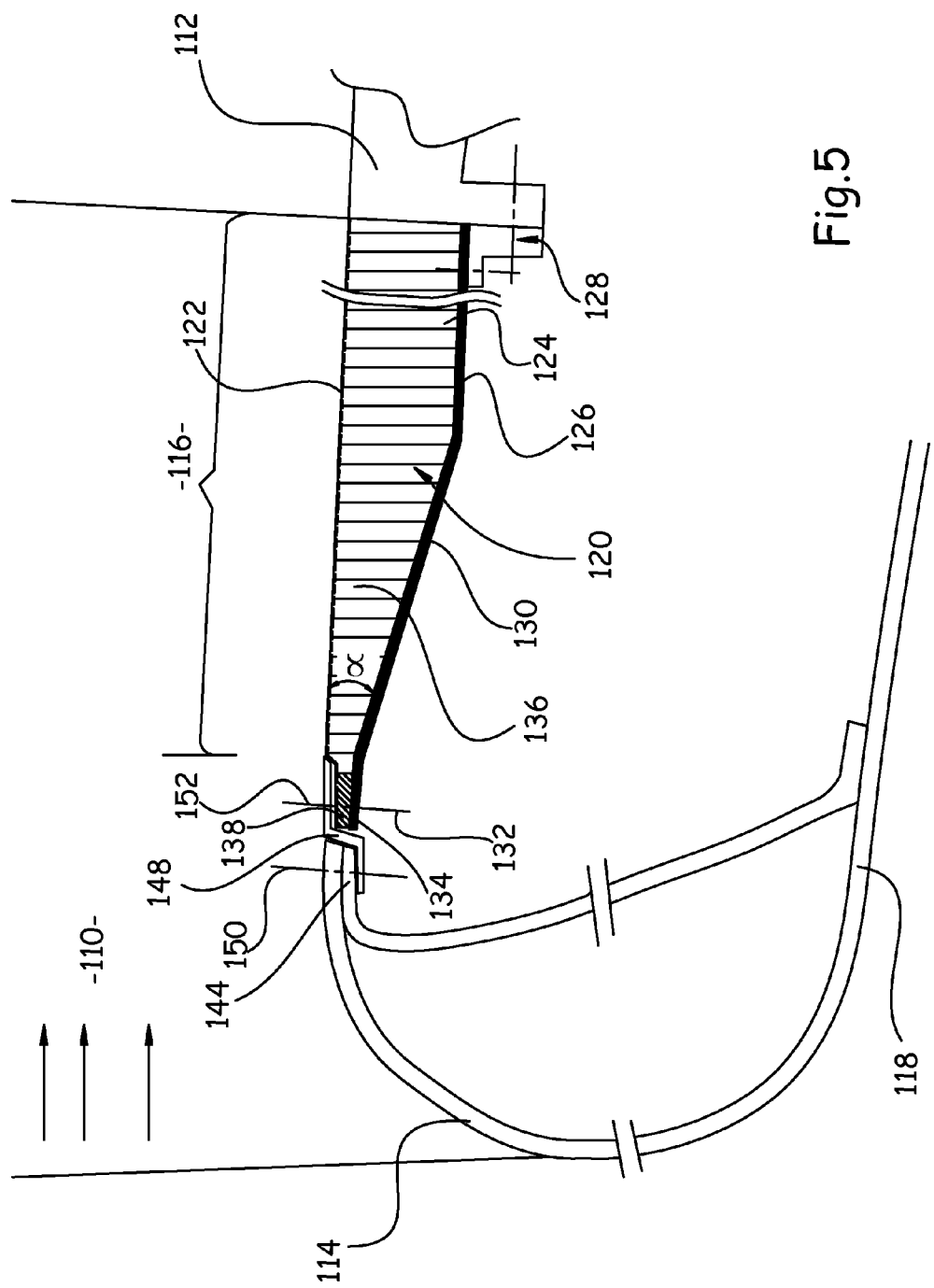
FIG. 5 is a cutaway that illustrates the junction zone between a lip and an acoustic treatment panel according to another variant of the invention.

According to the variants that are illustrated in FIGS. 4 and 5, the reflective layer 126 is connected to the acoustically resistive layer 122. Preferably, a block 138 is inserted between the reflective layer 126 and the acoustically resistive layer 122 so that the cells of the alveolar structure 136 all have an adequate height for providing acoustic treatment.

A junction element 140 provides the junction between the lip 114 and the acoustic treatment panel 120.

According to the variant that is illustrated in FIG. 4, the acoustically resistive layer 122 does not comprise an offset for the connection with the air intake, and the junction element 140 comprises a first part that is adapted so that it is flattened and attached by connecting means 142 to the inside surface of the lip 114, with the flange 144 of the front frame preferably being inserted between the junction element 140 and the lip 114. In addition, the junction element 140 comprises a second part that is adapted so that it is flattened and attached by connecting means 146 to the inside surface of the reflective layer 126.

According to a variant that is illustrated in FIG. 5, the junction element 148 comprises a first part that is adapted so that it is flattened and attached by connecting means 150 to the inside surface of the lip 114, with the flange 144 of the front frame preferably being inserted between the junction element 148 and the lip 114. In addition, the junction element 148 comprises a second part that is adapted so that it is flattened and attached by connecting means 152 to the outside surface of the acoustically resistive layer 122 that comprises an offset for housing this second part of the junction element 148. Advantageously, this second part has a small thickness relative to the rest of the junction element and/or comprises a beveled end so that the acoustically resistive layer 122 does not comprise reinforcement folds.

The invention claimed is:

1. An aircraft nacelle comprising:
   an air intake (110) with a lip (114) that is extended toward a rear of the air intake (110) by a pipe (116) constructed and arranged to channel an air flow in a direction of a power plant (112), wherein said pipe (116) comprises at least one acoustic treatment panel (120) that comprises, from the outside to the inside:

an acoustically resistive porous layer (122),
at least one first alveolar structure (124) whose cells are sized for acoustic treatment, and
a reflective or impermeable layer (126), wherein close to an end that is oriented toward the lip (114), said reflective or impermeable layer (126) comprises an inclined face (130) in such a way as to be connected to the lip (114), with a second alveolar structure (136) being in contact with the inclined face (130) of the reflective layer, the inclined face (130) forming an angle of less than 30° with a tangent to the acoustically resistive porous layer,
wherein the second alveolar structure (136) is inserted between said inclined face (130) of the reflective layer and the acoustically resistive porous layer, and the cells of the second alveolar structure (136) are sized for acoustic treatment.

2. The aircraft nacelle according to claim 1, further comprising a junction element (140, 148) for providing the connection between the lip (114) and the acoustic treatment panel (120).

3. The aircraft nacelle according to claim 2, wherein the junction element (140) comprises a first part that is adapted to be flattened and attached to an inside surface of the lip (114), and a second part that is adapted to be flattened and attached to an inside surface of the reflective layer (126).

4. The aircraft nacelle according to claim 2, wherein the junction element (148) comprises a first part that is adapted to be flattened and attached to an inside surface of the lip (114) and a second part that is adapted to be flattened and attached to an outside surface of the acoustically resistive layer (122) that comprises an offset for housing said second part of the junction element (148).

5. The aircraft nacelle according to claim 4, wherein said second part of the junction element (148) has a beveled end.

6. The aircraft nacelle according to claim 4, wherein said second part of the junction element (148) has a thickness that is reduced relative to a rest of the junction element.

7. The aircraft nacelle according to claim 1, further comprising a block (138) that is inserted between the reflective layer and the acoustically resistive layer (122) so that the cells of the second alveolar structure (136) all have an adequate height for providing acoustic treatment.

8. The aircraft nacelle according to claim 5, wherein said second part of the junction element (148) has a thickness that is reduced relative to the rest of the junction element.

9. The aircraft nacelle according to claim 2, further comprising a block (138) that is inserted between the reflective layer and the acoustically resistive layer (122) so that the cells of the second alveolar structure (136) all have an adequate height for providing acoustic treatment.

10. The aircraft nacelle according to claim 3, wherein it comprises a block (138) that is inserted between the reflective layer and the acoustically resistive layer (122) so that the cells of the second alveolar structure (136) all have an adequate height for providing acoustic treatment.

11. The aircraft nacelle according to claim 4, further comprising a block (138) that is inserted between the reflective layer and the acoustically resistive layer (122) so that the cells of the second alveolar structure (136) all have an adequate height for providing acoustic treatment.

12. The aircraft nacelle according to claim 5, further comprising a block (138) that is inserted between the reflective layer and the acoustically resistive layer (122) so that the cells of the second alveolar structure (136) all have an adequate height for providing acoustic treatment.

13. The aircraft nacelle according to claim 6, further comprising a block (138) that is inserted between the reflective layer and the acoustically resistive layer (122) so that the cells of the second alveolar structure (136) all have an adequate height for providing acoustic treatment.

14. The aircraft nacelle according to claim 8, further comprising a block (138) that is inserted between the reflective layer and the acoustically resistive layer (122) so that the cells of the second alveolar structure (136) all have an adequate height for providing acoustic treatment.

15. An aircraft nacelle comprising:
an air intake (110) with a lip (114) that is extended toward a rear of the air intake (110) by a pipe (116) constructed and arranged to channel an air flow in a direction of a power plant (112), wherein said pipe (116) comprises at least one acoustic treatment panel (120) that comprises, from the outside to the inside:
an acoustically resistive porous layer (122),
an alveolar structure (124, 136), wherein all cells of the alveolar structure (124, 136) are of uniform width and are sized for acoustic treatment, and
a reflective or sound impermeable layer (126), wherein close to an end that is oriented toward the lip (114), said reflective or sound impermeable layer (126) includes an inclined face (130) in such a way as to be connected to the lip (114) and a non-inclined face, the alveolar structure (124, 136) being in contact with both the inclined face (130) and the non-inclined face of the reflective layer, the inclined face (130) forming an angle of less than 30° with a tangent to the acoustically resistive porous layer,
wherein the acoustically resistive porous layers defines a plurality of pores disposed under both the inclined face (130) and non-inclined face of the reflective or sound impermeable layer (126).

16. The aircraft nacelle according to claim 15, further comprising a junction element (140, 148) for providing the connection between the lip (114) and the acoustic treatment panel (120).

17. The aircraft nacelle according to claim 16, wherein the junction element (140) comprises a first part that is adapted to be flattened and attached to an inside surface of the lip (114), and a second part that is adapted to be flattened and attached to an inside surface of the reflective layer (126).

18. The aircraft nacelle according to claim 16, wherein the junction element (148) comprises a first part that is adapted to be flattened and attached to an inside surface of the lip (114) and a second part that is adapted to be flattened and attached to an outside surface of the acoustically resistive layer (122) that comprises an offset for housing said second part of the junction element (148).

19. The aircraft nacelle according to claim 18, wherein said second part of the junction element (148) has a beveled end.

20. The aircraft nacelle according to claim 18, wherein said second part of the junction element (148) has a thickness that is reduced relative to a rest of the junction element.

* * * * *